Oct. 6, 1964 E. E. LOEBNER 3,152,222

ELECTROLUMINESCENT COLOR IMAGE DEVICE

Filed March 24, 1955 2 Sheets-Sheet 1

INVENTOR:
EGON E. LOEBNER

BY Laurence Burns,
ATTORNEY.

ELECTROLUMINESCENT COLOR IMAGE DEVICE

INVENTOR:
EGON E. LOEBNER
BY Laurence Burns,
ATTORNEY.

3,152,222
ELECTROLUMINESCENT COLOR IMAGE DEVICE

Egon E. Loebner, Arlington, Mass., assignor, by mesne assignments, to Sylvania Electric Products Inc., Wilmington, Del., a corporation of Delaware Filed Mar. 24, 1955, Ser. No. 496,449
4 Claims. (Cl. 178—5.4)

The invention relates to light amplifiers, color convertors and the like. A color convertor is a phosphor screen which when excited by light of one color, will emit light of a different color, and in particular can be a screen which emits a colored image on excitation by a monochrome image. A light amplifier is a device which when excited by light of one intensity, emits light of a greater intensity.

Color conversion and light amplification can be accomplished by the use of electroluminescent materials, although color conversion of itself does not necessarily require such materials. Electroluminescence is the production of light by electrical excitation in a solid material. The latter is generally in the form of small crystals or particles and is often called a phosphor.

I have found that light amplification can be obtained with such devices, that is, that a small intensity of incident light can be used to control the emission of a higher intensity of light. For example, an image of low intensity can be focused on a screen and a corresponding image of much higher itensity obtained therefrom on said screen.

Such a result can be achieved by placing a photoconductive material over an electroluminescent screen in a continuous layer and applying a voltage to both screens in series between a pair of electrodes, at least one of the latter being of the transparent conductive type. The electroluminescent screen can be, for example, of copper-activated zinc sulfide, cadmium sulphide having an excess of cadmium, or other electroluminescent phosphors. The photoconductive screen can be of material such as anthracene, tetracene, or cadmium sulphide, which are intrinsic photoconductors; materials such as activated cadmium sulphide, sensitized by so-called doping agents, such as gallium or idium which are extrinsic photoconductors; or materials sensitive to light because of the presence of barrier layers, among which materials are selenium, germanium, silicon, and numerous Group III-Group V and Group II-Group VI compounds when prepared by methods well known in the art.

I have found that in each electroluminescent substance there is a definite and sharp threshold voltage, which varies from 5 to 2000 volts for different substances, below which electroluminescence does not occur. I have also found that this threshold voltage will vary with the intensity of the incident light of a wavelength which is characteristic of the substance (that is, a wavelength short enough to be capable of producing photoconduction), becoming less as the incident illumination is increased. Accordingly, my device can be adjusted so that in the absence of incident light, or in the absence of light other than the ambient light in the room, the voltage across the electroluminescent material will be below the threshold value, and no electroluminescence will result. The application of additional incident light will then lower the threshold voltage and cause electroluminescence.

This effect can be enhanced by providing a photosensitive barrier in the electroluminescent material, or by adding a photosensitive susbtance to the electroluminescent material, for example by depositing a photosensitive material on electroluminescent particles or over an electroluminescent film. When the phosphor is used directly, without being suspended in a dielectric material, the threshold voltage can be shifted by applying a direct current bias to the device, thereby effectively changing the optical coupling.

The use of photosensitive materials responding to different spectral regions and the use of electroluminescent sources having different emission colors provides a device in which the emission color can be controlled by varying the spectral region of the incident (exciting) radiant flux. If the excitation and emission spectra are narrow enough, color conversion can be obtained; for example red light can be used for excitation and the emitted light can be blue. Adjoining areas on the screen can be made to respond to different excitation regions or to emit in different spectral ranges, or both. The word "color" is used in the sense of including ultraviolet and infra-red regions of particular wavelengths, as well as wavelength regions of visible radiation.

In one aspect of my invention, a colored image can be produced on an electroluminescent light-amplifying screen by focusing thereon an image from monochrome picture tube, often called a "black-and-white" picture tube, the screen of the monochrome tube being excited by a cathode ray deflection system, for example, of the type designed to excite a screen having a series of three-dot groups (each "dot" of the three emiting light of a different color), but used in this case to excite a so-called monochrome screen, that is, a screen in which each "dot" radiates the same color. The monochrome image produced is focused or otherwise directed onto a light-amplifier, the sensitive screen of the latter device being made up of a series of three-dot color groups, one of the dots in each group emitting red light when excited, another green and another blue, for example. All three types of dots can be excited by the same wavelength of incident light. In a further modification, the light-amplifier screen need not amplify light, but need merely convert it into colors, if the incident light is sufficiently intense. Each dot will have directly or indirectly a photosensitive surface for receiving the incident light, and a light-emitting surface for radiating light.

If desired, the light-emitting screen can be merely a phosphor screen of three-dot color-groups excited by the monochrome light emitted from the picture tube, without electroluminescence. Light amplification will not then be obtained, but merely color conversion.

In addition to modulating a high intensity of light by a weaker intensity of light, my device can vary the intensity of the light at different points on the transverse area of the electroluminescent layer, thereby producing an image on the latter in response to a weaker image incident on the photoconductive layer.

Other advantages, features and objects of the invention will be apparent from the following specification, taken in connection with the accompanying drawing in which.

Figure 1:
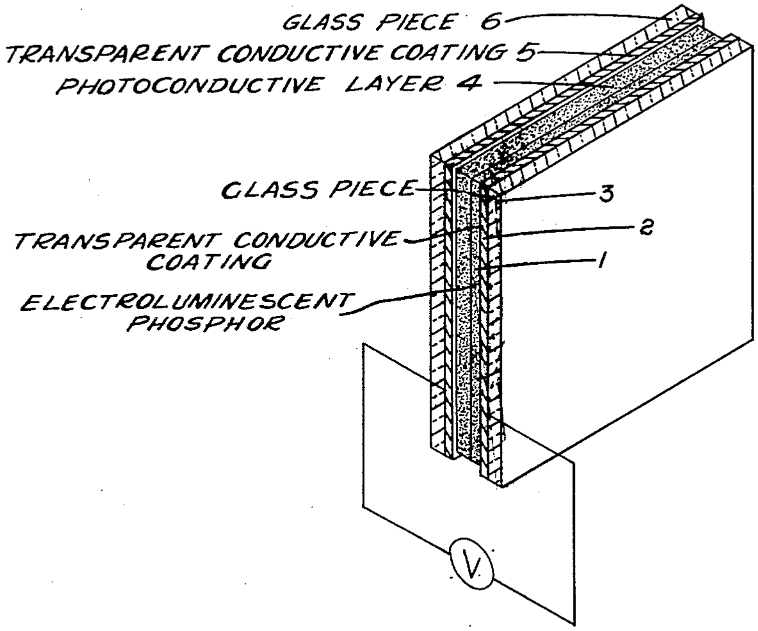
FIGURE 1 is a schematic representation of one embodiment of my device.

In FIGURE 1, the electroluminescent layer 1 is applied over an electrically-conductive transparent coating 2 on a piece 3 of glass or other light-transmitting medium, and the layer 4 of photoconductive material, is applied over the other side of the electroluminescent layer 1. A transparent electrically conductive layer 5 is over and in contact with the photoelectric layer 4, said electrically-conductive layer being on the surface of the plate 6 of glass or other light-transmitting material.

The electroluminescent layer 1 can be of phosphor particles embedded in dielectric material, as shown in copending application Serial No. 180,783 filed August 22, 1950 by Elmer C. Payne, now U.S. Patent No. 2,838,-715, issued June 10, 1958 or in application Serial No. 365,617 filed July 2, 1953, by Richard M. Rulon, now abandoned, but of which a continuation has been issued as U.S. Patent 3,103,607 on September 10, 1963 or in some other convenient manner. The photoconducting layer 4 can be of selenium, cadmium sulphide, anthracene, germanium, or the like, materials now well-known in the art. In general, suitable photoconducting substances will be compounds of a Group III element with one of Group V, or of a Group II element with one of Group VI, the groups being those of the usual Periodic Table. The transparent conducting layer can be of stannous chloride or the like applied on glass or other material as shown in said Rulon application, or in other manners known in the art.

The phosphors can be of copper-activated zinc sulfide, as shown in said Payne application, or in copending applications Serial No. 230,711, filed June 8, 1951, respectively by Keith H. Butler and Ser. No. 230,713 by Keith H. Butler and Horace H. Homer, now issued as U.S. Patents 2,772,242 issued December 27, 1956 and 2,728,730 issued December 27, 1955 or can be any other suitable electroluminescent materials. In general, the electroluminescent materials will be activated compounds of one Group IV element with another of the same group, or a compound of a Group II element with a Group VI element, although other electroluminescent substances can be used.

The foregoing embodiments will be useful whether the applied voltage is alternating or direct. When direct current is used, however, the embedding dielectric material can be omitted if desired and layer 1 made wholly of electroluminescent phosphor particles, deposited as phosphor particles are deposited on the usual fluorescent lamp or on cathode ray tube, or sintered at a temperature below that at which the conductive glass was made. A high degree of uniformity of threshold voltage from particle to particle will give a sharper threshold voltage for the phosphor as a whole, with consequent increased sensitivity and sharper control of the brightness.

With a fixed voltage placed across the two screens in series, any change in conductivity produced in the photoconductive layer by the incident light will produce a change in the voltage across the electroluminescent layer and hence a change in its light output. The resistance of the photoconductive layer should be high compared to the impedance of the electroluminescent layer in order that changes in the resistivity will produce considerable variations in the voltage across the electroluminescent layer. The voltage impressed across the layers in series should be high enough to insure sufficient brightness of the electroluminescent layer when incident light falls on the photoconductive layer, and the resistance of the photoconductive layer should be low enough to allow enough voltage across the electroluminescent layer to give sufficient brightness at the minimum light intensity to which response is desired, yet high enough to insure that there will be little or no brightness in the absence of incident light.

In the absence of incident light, the impedance of the photoconductive layer 4 should generally be high enough to bring the voltage across the phosphor down to a value below the electroluminescent threshold voltage so that no appreciable light is emitted from the electroluminescent layer 1 unless light is applied to the device.

If desired, the layer 5 can be made of a reflecting or even of an opaque metal coating and the glass piece 6 omitted, the incident light then being applied through the same glass piece 3 which transmits the amplified or emitted light.

Figure 2:
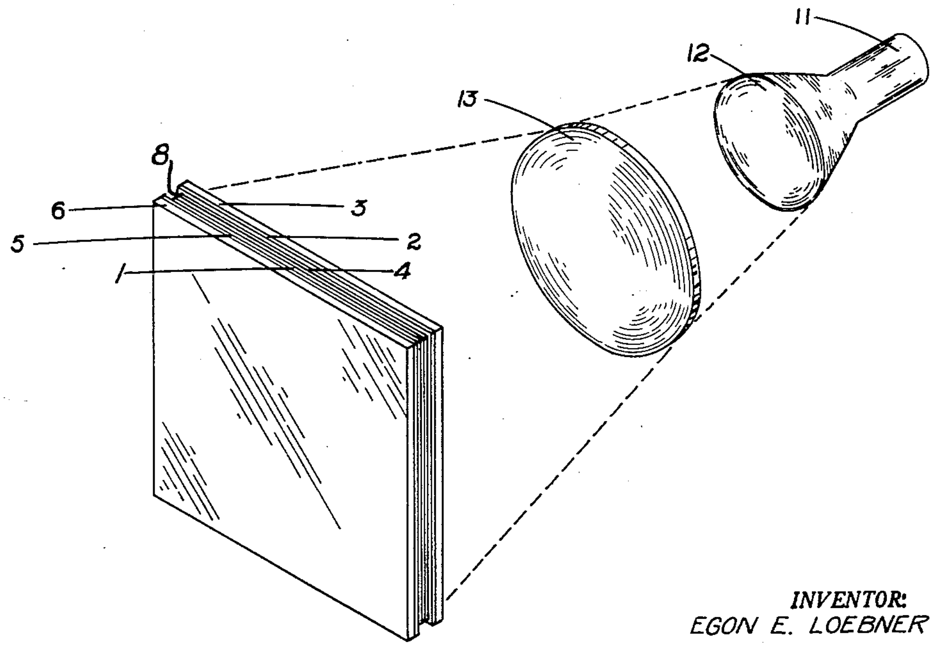
FIGURE 2 is a schematic diagram of apparatus in which an image is amplified according to my invention.

In FIGURE 2, a small cathode ray tube 11 has an image produced on its screen 12 which is enlarged by the lens 13, focused onto the photoconductive layer 4. The opaque layer 8 is in contact with the side of layer 4 opposite to that on which the image is focused, and an electroluminescent layer 1 is in contact with the other side of the opaque layer 8. Transparent conductive layers 2, 5, are in contact with the outside surfaces of layers 4 and 1, and are backed up by the glass supporting plate 3, 6. A source of voltage is connected to the conductive layers 2, 5.

In operation, an image is produced on the screen 12 of cathode ray tube 11 in the usual manner, for example, a moving picture as produced when the tube 11 is the picture tube of a television set. The image is enlarged by the lens 13 and focused on the photoconductive layer 4, where it will appear in less bright form due to the increase in its area. The light falling on the photoconductive layer 4 will reduce the resistance of that layer, however, and that will increase the voltage across the electroluminescent layer, thereby causing the latter to emit light. This light can be much greater in intensity than the light received on the photoconductive layer 4.

As previously explained, the resistance of the photoconductive layer 4 will be made high enough so that the light emitted by the electroluminescent layer will be negligible when no light falls on the photoconductive layer, despite the presence of a voltage across the whole device in series. In many cases, it will be desirable to make the photoconductive layer 4 of a material which will respond to ultraviolet radiation and be relatively insensitive to visible light, so that it will not be affected by the general illumination in the room. However, visible light or even infrared can be used, with proper choice of the photoconductive materials, of which many are known in the art.

The photoconductive layer 4 can be applied to the electroluminescent layer 1 by spraying evaporating, settling, painting, vapor state reactions, sintering or the like.

Figure 3:
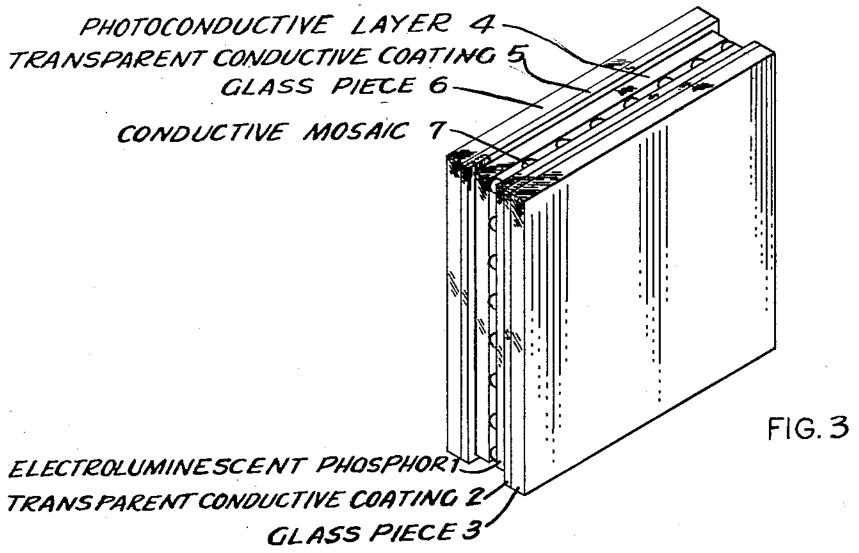
FIGURE 3 is a schematic diagram of an embodiment in which two barrier layers are used back-to-back.

In FIGURE 3, a conductive layer 7 is applied between the photosensitive layer 4 and the electroluminescent layer 1. The layer 7 is preferably made in the form of a mosaic of "dots" or small areas, to prevent laterally short-circuiting the photoconduction layer 4.

The arrangement of FIGURE 3 is especially useful when the voltage applied to the device is alternating, and when the photosensitivity is due to the voltage barrier between the photosensitive material and a metal or other conducting material, or within the photoconductor itself. The layer 7 is preferably made of the same material as layer 5, or of a similar material, in order to provide the same type of barrier, and permit the device to operate in the same manner regardless of the polarity of the applied alternating current cycle at any instant. For this purpose, layers 5 and 7 can be made of evaporated metal, if necessary, the layers being thin enough for light transmission. The p–n type of barrier can be used instead of the metal-crystal barrier, if desired, as can be n–i, p–i, $n^+$ to $n^-$, $p^+$ to $p^-$, and the reverse of each of these. The nomenclature above is standard in the art.

Voltage barriers can also be found in materials which do not contain any added donor or acceptor impurities. For example, in many metal sulfides, for example, such as those of lead, cadmium and zinc, electrical conduction can occur because of a deficiency in the anion or the cation, that is, because of the presence of anion or cation vacancies, for example cadmium or sulfur vacancies in cadmium sulfide.

Such vacancies can be produced in localized regions by varying the temperature non-uniformly, varying the partial pressures of the components, or in other ways.

If in preparing zinc sulfide, the partial pressure of the zinc component is higher than the stoichiometric equilibrium value, the vacancies will be sulfur ions, and vice versa.

If the conditions are such that there is a transition from a region having zinc vacancies to one having sulfur vacancies in a sufficiently short distance, a voltage barrier will exist. A barrier will also exist across a thin crystal portion of an insulating nature sandwiched between two conducting portions.

In particular, one region of a zinc sulfide crystal, or a continuous layer of zinc sulfide deposited on a surface, can be either self-activated or activated by one of the usual substances such as copper, silver or manganese, can have in contact therewith a region or a layer of zinc sulfide having a deficiency of zinc, and over that a region or layer of zinc sulfide having a deficiency of sulfide, and vice versa. There will then be an electroluminescent junction between the activated material and the layer over it, and a photoconductive junction between the other two layers.

Figure 4:
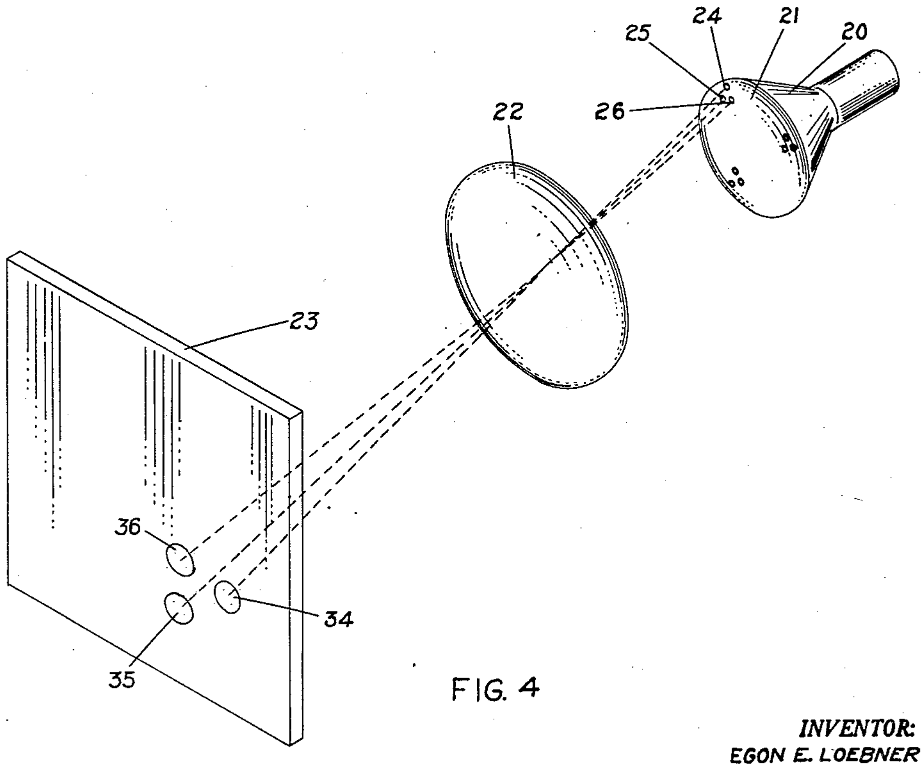
FIGURE 4 is a schematic diagram of a picture tube having a monochrome screen focused onto a light-amplifier having a color-emitting screen.

FIGURE 4 shows a cathode ray tube 20, generally called a picture tube, having a fluorescent screen 21 of a phosphor, an optical lens 22 focusing an image of the screen on the electroluminescent or photosensitive screen 23, which can be, for example, the photosensitive layer 4 of the device of FIGURE 1. The screen 21 of the picture tube is excited by an electron beam inside the cathode ray tube, in the manner usual for color television, for example in the three-color dot-sequential system. The three areas marked 24, 25, and 26 correspond respectively to the blue, green, and red dots of the usual color television system. Actually, however, the screen 21 is uniform on a scale on which color television tubes are differentiated and its emission color does not vary from area to area (24, 25, 26), that is, it is composed of a uniform blend of phosphor particles small enough to give a uniform color over a single "dot" area of the picture screen. The picture on screen 21 is monotone, but the brightness of the separate small "dot" areas vary in accordance with the separate blue, green, and red color regions of an ordinary color picture tube.

The image from the monotone screen 21 is focused by lens 22 onto photosensitive screen 23, which is composed of a series of phosphor "dot" areas having emission colors of blue, green, and red, respectively, such as areas 34, 35, 36 respectively.

It will be understood that various changes and modifications in the above-described devices and methods can be made by one skilled in the art, without departing from the spirit and scope of the invention.

What I claim is:

1. An electroluminescent device comprising an electrode, a layer of electroluminescent phosphor thereon, said layer being arranged in a series of groups of three dots, each dot in a group having an emission color different from that of the other two dots, a photoconductive layer over said electroluminescent layer and arranged in a series of dots in register with those of the electroluminescent layer, another electrode thereover, at least one of said electrodes being light-transmitting, a source of voltage connected across said electrodes, a cathode ray tube having a uniform phosphor screen, means for forming an image on said screen, said image being composed of luminous dots in three series, each of said three series having at each of its dots an intensity corresponding to the intensity of a particular color at the position of that dot, and means for irradiating the photoconductor screen with the luminescent dots, the dots of each of said three series being in register with the dots emitting said color in the electroluminescent layer, whereby an image in several colors is emitted by the electroluminescent layer in response to an image in a fixed color on the screen of the cathode ray tube.

2. An electroluminescent device comprising a screen including a multiplicity of groups of discrete electroluminescent phosphor elements arranged in a predetermined order of cyclic succession each of said groups consisting of a blue-emitting element, a green-emitting element, and a red-emitting element, and electrode means including an electrode on each side of said screen for establishing an electric field across each of said elements.

3. An electroluminescent device according to claim 2 wherein said elements are electroluminescent phosphor dots.

4. An electroluminescent device comprising a screen including a multiplicity of groups of discrete electroluminescent phosphor elements arranged in a predetermined order of cyclic succession, each of said groups consisting of a blue-emitting element, a green-emitting element, and a red-emitting element, electrode means including an electrode on each side of said screen for establishing an electric field across each of said elements, and means for exciting said elements in a predetermined order of cyclic succession.

References Cited in the file of this patent

UNITED STATES PATENTS

| | | |
|---|---|---|
| 2,594,740 | De Forest et al. | Apr. 29, 1952 |
| 2,605,335 | Greenwood et al. | July 29, 1952 |
| 2,650,310 | White | Aug. 25, 1953 |
| 2,768,310 | Kazan et al. | Oct. 23, 1956 |
| 2,773,992 | Ullery | Dec. 11, 1956 |
| 2,780,731 | Miller | Feb. 5, 1957 |
| 2,785,220 | Reed | Mar. 12, 1957 |
| 2,821,637 | Roberts et al. | Jan. 28, 1958 |
| 2,837,660 | Orthuber et al. | June 3, 1958 |
| 2,837,661 | Orthuber et al. | June 3, 1958 |

FOREIGN PATENTS

| | | |
|---|---|---|
| 157,101 | Australia | June 16, 1954 |

OTHER REFERENCES

Destriau: Philosophical Magazine, October 1947; vol. 38, pp. 700–713.

Orthuber et al.: A Solid-State Image Intensifier, Journal of the Optical Society of America, vol. 44, No. 4, pages 297 to 299, April 1954.

Piper: Electroluminescence, General Electric Review, July 1954.